US006273347B1

(12) United States Patent
Mihayashi et al.

(10) Patent No.: US 6,273,347 B1
(45) Date of Patent: Aug. 14, 2001

(54) PRE-EXPANDED PARTICLES OF PROPYLENE RESIN, PROCESS FOR PREPARING THE SAME AND FLOW-RESTRICTING DEVICE

(75) Inventors: Tsuyoshi Mihayashi; Nobuhisa Ota; Naruhiko Akamatsu; Yutaka Yanagihara; Takeshi Satoh, all of Settsu (JP)

(73) Assignee: Kaneka Corporation, Osaka (JP)

( * ) Notice: Subject to any disclaimer, the term of this patent is extended or adjusted under 35 U.S.C. 154(b) by 32 days.

(21) Appl. No.: 09/642,025

(22) Filed: Aug. 21, 2000

Related U.S. Application Data

(62) Division of application No. 09/495,329, filed on Feb. 1, 2000, now Pat. No. 6,130,266.

(30) Foreign Application Priority Data

Feb. 4, 1999 (JP) .................................................... 11-26817
Mar. 15, 1999 (JP) .................................................... 11-69184

(51) Int. Cl.[7] .............................. B05B 1/30; B05B 15/00; C08J 9/228; C08J 9/22
(52) U.S. Cl. ............................ 239/569; 239/542; 521/60; 521/917
(58) Field of Search .................................. 239/569, 542; 521/60, 917

(56) References Cited

U.S. PATENT DOCUMENTS

| | | | |
|---|---|---|---|
| 4,567,209 | 1/1986 | Park | 521/79 |
| 4,626,555 | 12/1986 | Endo et al. | 521/58 |
| 4,720,509 | 1/1988 | Nakamura | 521/58 |
| 4,982,899 | * 1/1991 | Kille et al. | 239/569 |
| 5,020,726 | * 6/1991 | Myres | 239/569 |
| 5,908,161 | * 6/1999 | Womac | 239/569 |
| 6,109,547 | * 8/2000 | Ritschtz | 239/569 |

* cited by examiner

*Primary Examiner*—Morton Foelak
(74) *Attorney, Agent, or Firm*—Armstrong, Westerman, Hattori, McLeland & Naughton, LLP

(57) ABSTRACT

There is provided pre-expanded particles of a propylene resin having a high expansion ratio and excellent molding adhesion without using a volatile blowing agent or increasing an expansion pressure. The pre-expanded particles of a propylene resin are prepared by the process comprising dispersing resin particles comprising a propylene resin composition, which contains 100 parts by weight of (A) a random copolymer of ethylene and propylene having an ethylene content of 1.5 to 4.5% by weight and 0.001 to 10 parts by weight of (B) an alkali metal salt of a copolymer of ethylene and (meth)acrylic acid, into an aqueous dispersion medium in a pressure vessel to obtain a mixture, heating the mixture to an expansion temperature higher than a softening temperature of the resin particles, introducing an inorganic gas, and releasing the mixture into a lower atmosphere than the inner pressure of the pressure vessel; said mixture is expanded after a temperature of said mixture is maintained at a temperature region of not more than the expansion temperature to at least (the expansion temperature −1° C.) for at least 30 minutes.

7 Claims, 8 Drawing Sheets

PRE-EXPANDED PARTICLES OF PROPYLENE RESIN, PROCESS FOR PREPARING THE SAME AND FLOW-RESTRICTING DEVICE

This application is a division of prior application Ser. No. 09/495,329, filed Mar. Feb. 1, 2000 now U.S. Pat. No. 6,130,266.

BACKGROUND OF THE INVENTION

The present invention relates to pre-expanded particles of a propylene resin and a process for preparing the same. More particularly, the present invention relates to pre-expanded particles of a propylene resin, which can be suitably used, for example, as a raw material for in-mold foamed articles, and a process for preparing the same. And the present invention relates to a flow-restricting device, which is used for a releasing part at preparing expanded particles by dispersing thermoplastic resin particles into an aqueous dispersion medium in a pressure vessel, impregnating a blowing agent and releasing the mixture into a lower atmosphere, and a drawing machine having the flow-restricting device.

There have been conventionally known a process for preparing pre-expanded particles of a propylene resin by dispersing particles of a propylene resin into an aqueous dispersion medium, and releasing the mixture into a lower atmosphere after heating and pressuring, and a process for preparing pre-expanded particles of a propylene resin by using a propylene resin containing a structure having two melting temperatures in a DSC curve measured by a differential scanning calorimeter in order to impart excellent in-mold moldability (disclosed in, for example, Japanese Unexamined Patent Publication No.176336/1984).

A process for preparing pre-expanded particles of a propylene resin has been conventionally known, wherein an inorganic gas such as carbon dioxide gas, nitrogen or air is used as a blowing agent (disclosed in, for example, Japanese Unexamined Patent Publication Nos.221440/1985, 229936/1985, and 259724/1996).

However, if pre-expanded particles are prepared by using a propylene resin such as a random copolymer of ethylene and propylene and the above-mentioned inorganic gas as a blowing agent, it becomes impossible to expand the pre-expanded particles in a high expansion ratio. Since an expansion force of the blowing agent becomes insufficient due to a lack of solubility of an inorganic gas used as a blowing agent into a resin, or it becomes impossible to use an expansion force effectively as an expansion ratio of the pre-expanded particles due to a high transparency.

Therefore, the present inventors developed and filed an excellent method for preparing pre-expanded particles having desired properties by dispersing the propylene resin and resin particles, wherein a hydrophilic polymer is a base resin, into an aqueous dispersion medium, heating the mixture to at least a softening temperature of the propylene resin to obtain water-containing resin particles having a water content of 1 to 50%, and then releasing the mixture into a low atmosphere to expand the water-containing resin particles, by using water of a solvent as a blowing agent without a volatile blowing agent and/or an inorganic gas blowing agent (Japanese Patent Application No.84124/1996 specification). The method is an excellent process, since it is inflammable and safety, the blowing agent is cheap, it is gentle to environment and it becomes easy to increase an expansion ratio compared with the case in using an inorganic gas blowing agent such as air or nitrogen. But it has a drawback that it is difficult to increase the expansion ratio if a difference between the inside and outside pressure of the pressure vessel (expansion pressure) is not comparatively high, since it has a high boiling temperature and a high latent heat of vaporization compared with the conventional blowing agent.

The drawback is caused by the phenomenon wherein among the two melting temperatures shown in FIG. 1 an endothermic amount $\Delta H$ at the higher melting temperature closely relates to an expansion ratio of pre-expanded particles, and the expansion ratio of the pre-expanded particles decreases linearly with increasing the endothermic amount $\Delta H$ of the higher melting temperature. It is the same knowledge of the case in using an inorganic blowing agent such as carbon dioxide disclosed in Japanese Unexamined Patent Publication No.259724/1996

On the other hand, it was reported that the endothermic amount of the higher melting temperature closely related to moldability for in-mold and it was necessary to maintain the endothermic amount in a constant range in order to keep excellent moldability for in-mold (for example, Japanese Unexamined Patent Publication No.20662/1996).

Therefore, it is necessary to maintain the endothermic amount in a constant range, in which moldability for in-mold is kept excellent, and to increase an expansion pressure in order to increase an expansion ratio.

There has been conventionally known a process for preparing pre-expanded particles of a propylene resin especially by using an inorganic blowing agent, which is a process for suitably preparing pre-expanded particles containing a crystalline structure having two melting temperatures in a DSC curve. For example, in Japanese Unexamined Patent Publication Nos.17615/1993 and 223347/1991, it is described that the objective product can be obtained by maintaining non-crosslinked polypropylene resin at around the expansion temperature usually for 5 to 90 minutes, preferably 15 to 90 minutes. But the above-mentioned maintaining is divided into two steps and schedule controlling is complicated. It has been understood that an effect of the expansion ratio is insufficient in the present invention by using two-step temperature controlling described in Example of Japanese Unexamined Patent Application No.17615/1993, wherein a difference between the maintaining temperature of the first step and the second step is 5 C, and a maintaining time at both the first step and the second step is 15 minutes.

On the other hand, Japanese Unexamined Patent Publication No.176336/1984 discloses that moldability for in-mold becomes excellent by increasing a temperature difference $\Delta T$ of two melting temperatures of the pre-expanded particles of a propylene resin in a DSC curve measured by a differential scanning calorimeter. It is described that the temperature difference corresponding to $\Delta T$ is preferably at least 5° C. But in the publication there is no brief description of pre-expanded particles having $\Delta T$ of above 13° C. and a process for preparing the pre-expanded particles.

Conventionally, pre-expanded particles are generally prepared by heating particles of a thermoplastic resin dispersed into an aqueous dispersion medium in a pressure vessel, immersing a blowing agent, and releasing the mixture into a lower atmosphere to expand particles of a thermoplastic resin.

Releasing of particles of a thermoplastic resin is usually carried out by passing it through an opening provided at a flow-restricting device having an orifice type or nozzle type (disclosed in Japanese Unexamined Patent Publication No.197027/1983). The releasing is also carried out by passing it several times through an opening provided at a plurality of flow-restricting devices arranged in series tiward releasing direction (disclosed in Japanese Unexamined Patent Publication No.4909/1988).

As a thermoplastic resin, examples are a styrene resin, a vinyl chloride resin, a polyamide resin, a polyester resin, a polyolefin resin and the like. Particles having a desired shape such as sphere, column, elliptical column or cube are prepared by using these resins. A volatile blowing agent, an inorganic gas or water is used as the blowing agent (disclosed in WO97/38048 pamphlet).

As a flow-restricting device of orifice type or nozzle type provided at the releasing part, there is generally used the plate having 1 to slits, of which width is 4 to 20 mm, height is 4 to 20 mm, and depth at the narrowest part is to 200 mm, or the plate having 1 to holes, of which area is to 400 $mm^2$, and depth at the narrowest part is 5 to 200 mm. If an expansion ratio of expanded particles is increased by the above-mentioned method, it is carried out by increasing an inner pressure in a pressure vessel.

But if a volatile blowing agent is used as a blowing agent, it becomes necessary to increase an amount of the blowing agent and it becomes disadvantageous in production process and economy.

If expanded particles are prepared by using an inorganic gas or water as a blowing agent, it becomes disadvantageous in economy to obtain expanded particles having a desired high expansion ratio by increasing an inner pressure in a pressure vessel since the cost of the equipment becomes high.

SUMMARY OF THE INVENTION

Increasing an expansion ratio is investigated by maintaining the mixture for a long time at a temperature range, which is comparatively near the expansion temperature and not more than the expansion temperature, without increasing an expansion pressure. As a result, if the mixture is expanded after maintaining it for at least 30 minutes at a temperature range of the expansion temperature to the expansion temperature $-1°$ C., the temperature at the higher peak is increased, the temperature at the lower peak is decreased, and it is found that a temperature difference $\Delta T$ of two melting temperatures becomes at least 20° C. And it is found that a relationship of an exothermic amount $\Delta H$ at a higher peak and an expansion ratio in the obtained pre-expanded particles having $\Delta T$ of at least 20° C. becomes clearly different from that in the pre-expanded particles having $\Delta T$ of not more than 20° C. and an expansion ratio is improved in the same $\Delta H$. And investigating a relationship between a temperature difference $\Delta T$ of two melting temperatures and an improving ratio described below, an improving ratio is linearly increased with increasing $\Delta T$ and an improving effect of an expansion ratio becomes large.

And in carrying an experiment of molding for in-mold by using pre-expanded particles of a propylene resin having $\Delta T$ of at least 20° C., vapor pressure at molding can be decreased and a heating condition is large, wherein a molded article having an excellent property is obtained, due to an excellent molding adhesion.

Namely, the present invention relates to pre-expanded particles of a propylene resin comprising a propylene resin composition containing 100 parts by weight of (A) a random copolymer of ethylene and propylene having an ethylene content of 1.5 to 4.5% by weight and 0.001 to parts by weight of (B) an alkali metal salt of a copolymer of ethylene and (meth)acrylic acid ; said pre-expanded particles having two melting temperatures in a DSC curve measured by a differential scanning calorimeter, and a temperature difference $\Delta T$ between these two melting temperatures being at least 20° C., and a process for preparing pre-expanded particles of a propylene resin comprising dispersing resin particles, comprising a propylene resin composition, which contains 100 parts by weight of (A) a random copolymer of ethylene and propylene having an ethylene content of 1.5 to 4.5% by weight and 0.001 to parts by weight of (B) an alkali metal salt of a copolymer of ethylene and (meth)acrylic acid, into an aqueous medium in a pressure vessel to obtain a mixture, heating the mixture to an expansion temperature higher than a softening temperature of the resin particles, introducing an inorganic gas, and releasing the mixture into a lower atmosphere than the inner pressure of the pressure vessel; said mixture is expanded after a temperature thereof is maintained at a temperature region of not more than the expansion temperature to at least (the expansion temperature $-1°$ C.) for at least 30 minutes.

And the followings have been investigated.
(1) expanded particles having a high expansion ratio can be obtained in case of using a volatile blowing agent as a blowing agent, even if an inner pressure before releasing is adjusted at a low level and an amount of the blowing agent decreases.
(2) expanded particles having a high expansion ratio can be obtained in case of using an inorganic gas or water as a blowing agent, even if a condition is the same as before releasing.

As a result, by using a particular opening different from the conventional opening attached to a flow-restricting device, which is used as a releasing part, the object is attained to complete the present invention.

Namely, the present invention relates to a flow-restricting device, which is used for a releasing part at preparing expanded particles by dispersing thermoplastic resin particles into an aqueous dispersion medium in a pressure vessel, impregnating a blowing agent and releasing the mixture into a lower atmosphere ; said plate is equipped with at least one opening satisfying either of the following two conditions, (1) $L/Hf \geqq 1.5$ mm, Hn=1 to 4 mm, d=0 to 5 mm
(2) $L/Hf<1.5$ mm, S=0.5 to 10 $mm^2$, d=0 to 5 mm wherein a front width or a long diameter of the opening attached to the flow-restricting device is L, a height or a short diameter is Hf, a height or a short diameter at the narrowest part in the opening is Hn, an area at the narrowest part in the opening is S, and a depth (land length) is d.

DETAILED DESCRIPTION

Figure 1:
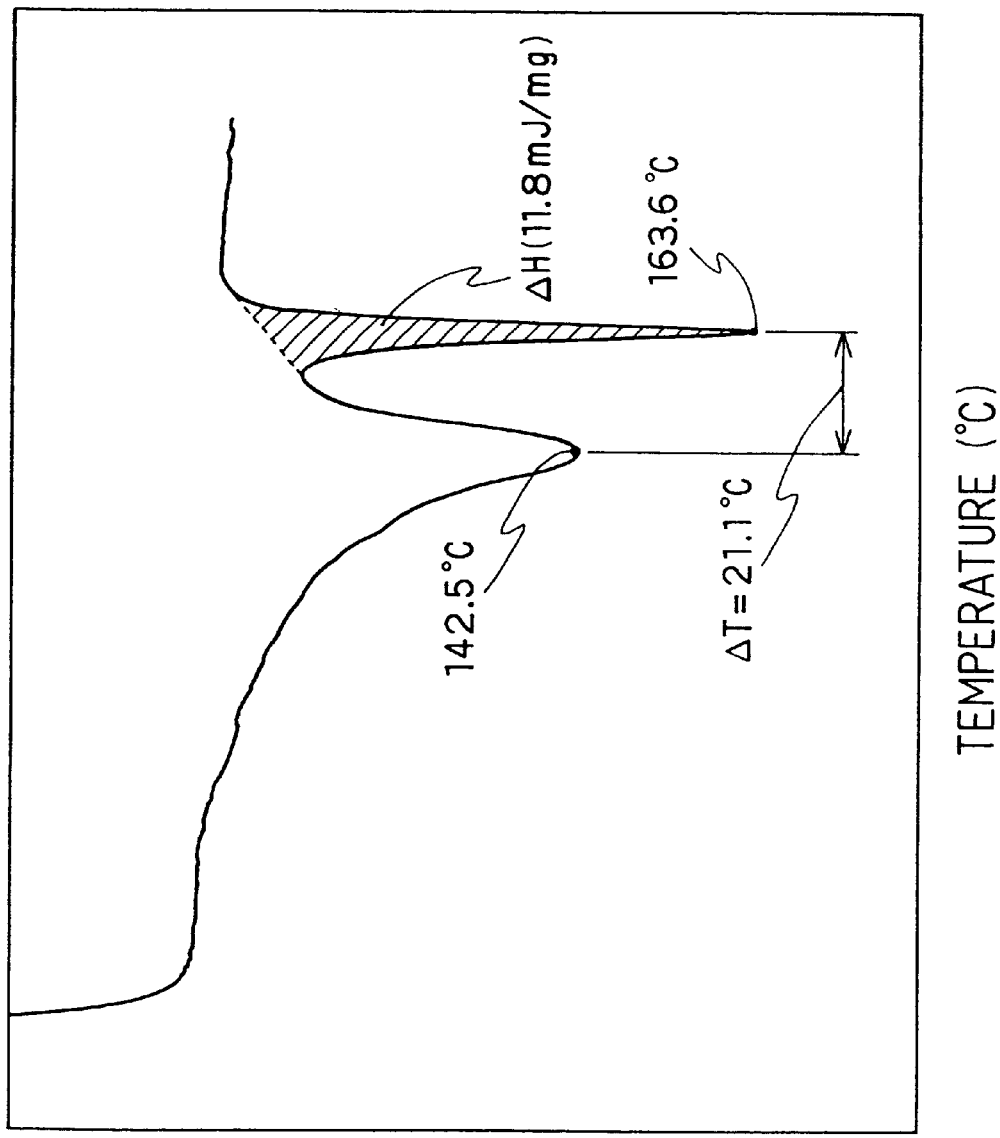
FIG. 1 shows a DSC curve of the pre-expanded particles obtained in Example 1. The DSC curve is used as explanation for a temperature difference $\Delta T$ of two melting temperatures, and an endothermic amount $\Delta H$ of the higher melting temperature.

In order to obtain the pre-expanded particles of a propylene resin of the present invention (hereinafter referred to as "pre-expanded particles of PP") from a propylene resin composition (hereinafter referred to as "PP resin composition"), a random copolymer of ethylene and propylene (hereinafter referred to as "a random copolymer of EP (A)"), of which an ethylene content is 1.5 to 4.5% by weight, preferably 1.5 to 4.0% by weight, is used as (A) component. If the ethylene content is less than 1.5% by weight, a melting temperature of PP resin composition becomes higher and heat resistance and mechanical strength of the molded article obtained by in-molding pre-expanded particles of PP are improved. But it is not preferable since a temperature difference of two melting temperatures of pre-expanded particles of PP becomes small. If the content is more than 4.5% by weight, ΔT tends to increase, but heat resistance and mechanical strength of a molded article decrease due to decreasing the melting temperature, and an expansion ratio becomes small due to decreasing the expansion temperature at preparation of pre-expanded particles of PP.

MI (melt index, 230° C. 0.212 MPa) of the random copolymer of EP (A) is preferably 0.5 to 40 g/10 minutes, more preferably 3 to 30 g/10 minutes. If the MI is less than 0.5 g/10 minutes, it is difficult to obtain pre-expanded particles having a high expansion ratio, since a melt viscosity is too high. If the MI is more than 40 g/10 minutes, it is difficult to obtain pre-expanded particles having a high expansion ratio, since a melt viscosity is low against elongation of a resin at expansion and it is easy to break cells.

A melting temperature of a random copolymer of EP (A) is usually 130 to 165° C., preferably 135 to 160° C., which depends on not only an ethylene content but also MI, since a random copolymer of EP (A) having an ethylene content of 1.5 to 4.5% by weight is used in the present invention. If the temperature is less than 130° C., ΔT tends to become large due to a large amount of ethylene, but heat resistance and mechanical strength of the molded article tend to become small. If the temperature is more than 165° C., heat resistance and mechanical strength of the molded article are improved, but it tends to become difficult to increase ΔT.

In PP resin composition, an alkali metal salt of a copolymer of ethylene and (meth)acrylic acid (hereinafter referred to as "ethylenically ionomer (B)") is used as the (B) component. An ethylenically ionomer (B) is used for increasing an absorbing amount of the blowing agent into particles of a resin (hereinafter referred to as "particles of a PP resin") from PP resin composition.

The ethylenically ionomer (B) is preferably a copolymer comprising 70 to 97% by weight, preferably 80 to 95% by weight, of ethylene and 3 to 30% by weight, preferably to 20% by weight, of (meth)acrylic acid, of which carboxyl groups are salted with an alkali metal ion such as sodium ion, potassium ion or lithium ion to ionically crosslink intermolecularly, from the viewpoint of securing sufficient compatibility with a propylene resin and a sufficient amount of water. An ionization ratio is preferably 20 to 100%, more preferably 50 to 100%. The ionization ratio is measured by the introduced metal ion (% by mole) based on 100% by mole of a carboxyl group in a copolymer of ethylene and (meth)acrylic acid.

Examples of the ethylenically ionomer (B) are "HIMILAN 1601", "HIMILAN 1605", "HIMILAN 1707", "HIMILAN 1856" available from Mitsui Du Pont Chemical Co., "SURLYN 1601", "SURLYN 1605", "SURLYN 1707", "SURLYN 1802", "SURLYN 1901" available from E. I. du Pont de Nemours & Co.Inc., and the like.

An amount of the ethylenically ionomer (B) is 0.001 to parts by weight, preferably 0.01 to parts by weight, more preferably 0.01 to parts by weight based on 100 parts by weight of the random copolymer of EP (A). If the amount is less than 0.001 part by weight, an effect of improving an expansion ratio is small compared with the case containing no ethylenically ionomer (B) since an amount of water absorbed into PP resin particles in a pressure vessel is decreased. If the amount is more than parts by weight, an amount of water absorbed into PP resin particles is increased, but production stability at preparation of pre-expanded particles, and properties such as mechanical strength, heat resistance and dimension stability at water absorption of the molded article obtained by in-molding pre-expanded particles are decreased.

In order to obtain pre-expanded particles having uniform and independent cells and a high expansion ratio, PP resin composition can contain filler.

An average particle diameter of the filler is preferably at most 50 μm, more preferably at most 20 μm, from the viewpoint of obtaining pre-expanded particles having uniform cells and a high expansion ratio, and obtaining a molded article having excellent mechanical strength and flexibility from the pre-expanded particles. Furthermore, it is preferable at least 0.1 μm, more preferably at least 0.5 μm from the viewpoint of prevention of insufficient dispersion due to secondary agglomeration and handling workablility.

In the filler there are an inorganic filler and an organic filler. Examples of the inorganic filler are talc, calcium carbonate, calcium hydroxide, aluminium hydroxide, silica, mica, china cray, diatom earth, rock wool, wollastonite, and the like. Among those, talc is preferable from the viewpoint of obtaining pre-expanded particles having uniform cells and a high expansion ratio. There is no particular limitation for the organic filler, as long as it is solid at a temperature higher than a softening point of the random copolymer of EP (A). Examples thereof are fluororesin powder such as poly (tetrafluoroethylene), silicone resin powder, thermoplastic polyester resin powder and the like. These may be employed solely or in a combination use of two or more thereof.

An amount of the filler is at least 0.003 part by weight, more preferably at least 0.005 part by weight, based on 100 parts by weight of a random copolymer of EP (A) from the viewpoint of obtaining pre-expanded particles having a high expansion ratio. Furthermore, it is preferably at most 3 parts by weight, more preferably at most 2 parts by weight, from the viewpoint of exhibiting excellent adhesion property at molding of the pre-expanded particles and obtaining a molded article made thereof having excellent mechanical strength and flexibility.

To the PP resin composition, there can be added an organic pigment such as azo, phthalocyanine, quinacridone or perylene, an inorganic pigment such as carbon black, a ketjen black, titan oxide, cobalt violet, cobalt blue or ultra marine, a colorant, and a stabilizer such as an antistatic agent, an antioxidant or an optical stabilizer, if necessary.

The pre-expanded particles of PP of the present invention is pre-expanded particles made from the PP resin composition comprising a random copolymer of EP (A), an ethylenically ionomer (B), and as an optional, a filler, a pigment, a colorant, an antistatic agent and a stabilizer. The pre-expanded particles are the pre-expanded particles of PP, which have two melting temperatures in a DSC curve measured by a differential scanning calorimeter, and of which a temperature difference $\Delta T$ is at least 20° C. Since $\Delta T$ is at least 20° C., moldability of in-molding is excellent.

The above-mentioned DSC curve obtained by a differential scanning calorimeter is the DSC curve obtained by heating 4.0 to 6.0 mg of the pre-expanded particles of PP from 40 to 220° C., at a heating rate of 10° C./min by using a differential scanning calorimeter.

For example, there are two endothermic peaks in the DSC curve of pre-expanded particles obtained by the following preparation method of the present invention, as shown in FIG. 1. If a peak temperature at a lower temperature is a lower melting temperature and a peak temperature at a higher temperature is a higher melting temperature, the above-mentioned $\Delta T$ is a temperature difference between these two melting temperatures.

An example of a process for preparing pre-expanded particles of PP is explained below.

The pre-expanded particles of PP is usually prepared by kneading the PP resin composition by means of an extruder, a kneader, a Banbury mixer, a roll and the like. And then, the composition is formed into resin particles having desired shapes such as cylinder, ellipsoid, sphere, cubic and rectangular parallelepipedic, which are easy to use in pre-expansion.

There is no particular limitation for preparation conditions of the PP resin particles and size of the PP resin particles. But the particles obtained by melt kneading in an extruder are, in general, 0.3 to 5 mg/particle.

In the process for preparation of the present invention, particles of PP resin prepared above are dispersed into an aqueous medium in a pressure vessel to obtain a mixture. Particles of PP resin are usually dispersed into an aqueous dispersion medium at a room temperature to 90° C.

The aqueous dispersion medium may be a solvent, which can not dissolve particles of PP resin. Examples thereof are typically water, and a mixture of water with at least one solvent selected from the group consisting of ethylene glycol, glycerin, methanol, ethanol and isopropanol. Water is preferable from environmental and economical points of view.

A dispersion agent and a surfactant as a dispersion assistant are usually added into the aqueous dispersion medium in amounts of 0.01 to 1 part by weight and 0.001 to 0.01 part by weight respectively based on 100 parts by weight of the aqueous dispersion medium.

Examples of the dispersion agent are tricalcium phosphate, basic magnesium carbonate, basic zinc carbonate, calcium carbonate, calcium hydroxide, aluminum oxide, talc, mica, china cray and the like.

Examples of the surfactant are anionic surfactants such as sodium dodecylbenzene sulfonate, sodium n-paraffin sulfonate and sodium α-olefin-sulfonate, and the like.

An amount of PP resin particles dispersed into the aqueous dispersion medium is preferably 3 to 100 parts by weight, more preferably to 80 parts by weight, particularly 10 to 70 parts by weight based on 100 parts by weight of the aqueous dispersion medium. If the amount is less than 3 parts by weight, productivity becomes low, thus being uneconomical. On the other hand, if the amount is more than 100 parts by weight, the PP resin particles tend to be fused together in a vessel during heating.

The mixture is heated to an expansion temperature higher than a softening temperature of the PP resin particles. The mixture is released into an atmosphere of lower pressure than the inner pressure in a pressure vessel to prepare the pre-expanded particles of PP resin. At this time, after a temperature of the mixture is maintained at most the expansion temperature and at least (the expansion temperature −1° C.) for at least 30 minutes, the mixture is expanded. An inorganic gas is preferably introduced in order that an expansion pressure need be controlled depending on the required expansion ratio. Among the above inorganic gases, ari is most preferable from the viewpoint of an earth environmental problem and cost. A temperature thereof is preferably about (an expansion temperature ±5° C.) from the viewpoint that evenness of an expansion ratio of the obtained pre-expanded particles is decreased.

An expansion temperature higher than the softening temperature of the PP resin particles is usually (melting temperature of the PP resin composition −10° C.) to (melting temperature +30° C.), preferably (melting temperature) to (temperature +5° C.), more preferably (melting temperature +5° C.) to (melting temperature +15° C. ). In the present invention a melting temperature of the PP resin composition means a peak temperature of an endothermic peak in the second heating run, which is obtained by heating PP resin particles to 40 to 220° C. in a heating rate of 10° C./min after heating 4.0 to 6.0 mg of them to 40 to 220° C. in a heating rate of 10° C./min by using a differential scanning calorimeter and then cooling them to 220 to 40° C. in a cooling rate of 10° C./min. If the expansion temperature is less than (melting temperature −10° C.), it becomes difficult to expand the particles. If the expansion temperature is more than (melting temperature +30° C.), all secondary crystalline of the PP resin particles in a pressure vessel melts, melting temperatures of the obtained pre-expanded particles becomes one, and the resin particles tend to be fused together in the vessel due to a high expansion temperature. If the PP resin composition having a melting temperature of 145° C. is used, the expansion temperature is usually 135 to 175° C., preferably 145 to 165° C., more preferably 150 to 160° C.

In the present invention the softening temperature is a value measured according to ASTM D-648 with 0.451 MPa.

The maintaining at not more than expansion temperature and not less than (expansion temperature −1° C.) for at least 30 minutes means maintaining a temperature of the mixture in a pressure vessel during counting maintaining time of at least 30 minutes from the time reaching the pre-determined temperature (foaming temperature −1° C.) after starting to heat to the expansion temperature. This differs from a concept that a maintaining temperature difference between the first step and the second step is 5° C. and the maintaining time at both the first step and the second step is 15 minutes, as disclosed in Example in Japanese Unexamined Patent Publication No.17615/1993, from the viewpoint of heat treating effectively and obtaining pre-expanded particles having higher $\Delta T$. During counting the maintaining time, a temperature of the mixture in a pressure vessel is controlled to be 1° C. between (expansion temperature −1° C.) and expansion temperature. But the controlling is not so difficult in spite of volume and shape of the pressure vessel. The controlling can be made by feedback controlling, for example, a temperature controlling system in an pressure vessel such as vapor, thermal solvent oil and electric heater.

The maintaining time is at least 30 minutes. The longer the maintaining time is, the more an effect of the present invention tends to increase. The reason is thought that the secondary crystalline grows sufficiently due to a long maintaining time at about the expansion temperature. But the time is preferably at most 5 hours in consideration of productivity of the pre-expanded particles.

There is no particular limitation for introducing time of an inorganic gas into a pressure vessel. From the viewpoint of decreasing load of the vessel and stability of an expansion pressure, the introducing is usually carried out at the latter half of the maintaining time. At this time a pressuring rate is preferably 0.098 to 0.98 MPa/minute from the viewpoint of small load to device, safety, not disturbing thermodynamic equilibrium in a pressure vessel, and not decreasing productivity.

If the PP resin particles in a pressure vessel are pre-expanded by releasing them from the pressure vessel, the expansion pressure is preferably maintained by maintaining a constant pressure in the pressure vessel during releasing. Concretely, a pressure in a pressure vessel is preferably maintained constant by supplying an inorganic gas into a pressure vessel, and the particles are released. In order to decrease evenness of an expansion ratio of the obtained pre-expanded particles, a temperature of the above inorganic gas is preferably about (an expansion temperature ±5° C.).

The expansion pressure is a pressure difference between an inner pressure in the pressure vessel and an atmosphere of lower pressure. Since the atmosphere of lower pressure is usually an atmospheric pressure, the expansion pressure becomes equal to a gauge pressure.

The expansion pressure is varied depending on a pre-determined expansion ratio. In order to obtain the pre-expanded particles having 3 to 50 times of an expansion ratio, the pressure is usually 0.784 to 5.88 MPa, preferably 0.98 to 4.41 MPa, more preferably 0.98 to 2.94 MPa. If the pressure is not more than 0.784 MPa, an average expansion ratio tends to decrease and the unexpanded resin particles tend to be incorporated into the product. If the pressure is not less than 5.88 MPa, machine load becomes large, a diameter of the obtained foams of the pre-expanded particles become small, a thickness of cell film forming foams becomes thin, it becomes easy to break cells, and a ratio of independent foams of pre-expanded particles is decreased. As a result, it becomes easy to decrease properties such as mechanical strength. Therefore, as mentioned above, the expansion ratio is preferably improved without increasing an expansion pressure.

In case of preparing the pre-expanded particles according to the above-mentioned method, the pre-expanded particles of PP are obtained, which have two melting temperatures in a DSC curve measured by a differential scanning calorimeter, and of which temperature difference is at least 20° C.

Next, the flow-restricting device and the machine having the flow-restricting device are explained below, which are used for preparation of the pre-expanded particles of a propylene resin of the present invention.

The flow-restricting device of the present invention is used for a releasing part, when particles of a thermoplastic resin are dispersed into an aqueous medium in a pressure vessel, the blowing agent is impregnated, and then the resin is released into an atmosphere of lower pressure to prepare the expanded particles.

There is no particular limitation for a pressure vessel, which is used in preparation of the expanded particles of a thermoplastic resin, as long as the flow-restricting device in the vessel is the plate of the present invention. The vessel used conventionally can be employed.

As the particles of a thermoplastic resin used in the flow-restricting device of the present invention, not only a polypropylene resin composition, but also a styrene resin, a vinyl chloride resin, a polyamide resin, a polyester resin, a polyolefin resin and the like. Among those, polyolefin resin such as the polypropylene resin composition is preferable from the viewpoint of obtaining expanded particles having a high expansion ratio and which are excellent in foamability, moldability and a balance among mechanical strength, heat resistance and flexibility of the obtained molded article.

The polyolefin resin is a resin containing 50 to 100% by weight, preferably 70 to 100% by weight, of an olefin monomer unit and 0 to 50% by weight, preferably 0 to 30% by weight, of a monomer unit copolymerizable with the olefin monomer. Since the resin contains at least 50% by weight of the olefin monomer unit, the resin is light and excellent in mechanical strength, processability, electric insulation, waterproof resistance and chemical resistance.

The monomer copolymerizable with the olefin monomer is used for improving adhesion, transparency, impact resistance and gas barrier. In order to obtain an effect of using the monomer, an amount thereof is preferably at least 2% by weight, more preferably at least 5% by weight.

Examples of the olefin monomer are an α-olefin monomer having 2 to 8 carbon atoms such as ethylene, propylene, butene, pentene, hexene, heptene or octene, and a cyclic olefin such as norbornene monomer. Among those, ethylene and propylene are preferable from the viewpoint that they are cheap and properties of the obtained polymer become excellent. These may be employed solely or in a combination use of two or more thereof.

Examples of the monomer copolymerizable with the olefin monomer are vinyl alcohol esters such as vinyl acetate, alkyl (meth)acrylate having 1 to 6 alkyl carbon atoms such as methyl methacrylate, ethyl acrylate and hexyl acrylate, vinyl alcohol, methacrylic acid, vinyl chloride and the like. Among those, vinyl acetate is preferable from the viewpoints of adhesion, flexibility and properties at a low temperature. And methyl methacrylate is preferable from the viewpoint of adhesion, flexibility, properties at a low temperature and thermal stability. These may be employed solely or in a combination use of two or more thereof.

As MI of the polyolefin resin, MI of the polyolefin resin is preferably 0.5 to 30 g/10 minutes, more preferably 3 to 25 g/10 minutes. And flexural modulus (JIS K 7203) thereof is preferably 490 to 1960 MPa, more preferably 784 to 1568 MPa. A melting temperature thereof is preferably 125 to 165° C., more preferably 135 to 150° C. If the MI is less than 0.5 g/minutes, it is difficult to obtain pre-expanded particles having a high expansion ratio since a melt viscosity is too high. If the MI is more than 30 g/10 minutes, it is difficult to obtain pre-expanded particles having a high expansion ratio since a melt viscosity is low against elongation of a resin at expansion, and it is easy to break cells.

Examples of the polyolefin resin are polypropylene resins such as a random copolymer of ethylene and propylene, a random terpolymer of ethylene, propylene and butene, a block copolymer of polyethylene and polypropylene and a homopolymer of polypropylene; polyethylene resins such as low density polyethylene, middle density polyethylene, high density polyethylene, linear low density polyethylene, a copolymer of ethylene and vinyl acetate and a copolymer of ethylene and methyl methacrylate; polybutene, polypentene and the like. These polyolefin resins may not be crosslinked, or may be branched or crosslinked by means of peroxides or radiation. Among those, a polypropylene resin is preferable, since pre-expanded particles having a high expansion ratio are easily obtained, and a molded article made thereof has good balance among mechanical strength and heat resistance compared with the other polyolefin resins. These polymers may be employed solely or in a combination use of two or more thereof.

A size of the particles of a polyolefin resin prepared from the polyolefin resin is usually 0.5 to 5 mg/particle.

If water is used as a blowing agent, water-containing resin particles having 1 to 50% of water content, which is measured by heating at not less than a softening temperature of the polyolefin resin particles, are used. And the resin particles preferably comprises a polyolefin resin composition containing 0.05 to 20 parts by weight of a hydrophilic polymer based on 100 parts by weight of the polyolefin resin in order to expand easier.

The hydrophilic polymer means a polymer having a water absorption ratio measured according to ASTM D570 of at least 0.5% by weight. It contains so-called a hygroscopic polymer, a water-absorptive polymer (which is not dissolved into water, absorbs water in an amount of several to several hundred times of its weight, and is not easily dehydrated under pressure) and a water-soluble polymer (which is dissolved into water at a room temperature or a high temperature). The hydrophilic polymer (B) can contain hydrophilic groups such as a carboxyl group, a hydroxyl group, an amino group, an amide group, an ester group and a poly(oxyethylene) group in its molecule.

Examples of the hygroscopic polymer are a polymer containing a carboxyl group, polyamide, thermoplastic polyester elastomer, cellulose derivatives and the like.

Examples of the polymer containing a carboxyl group are, for instance, a terpolymer of ethylene, acrylic acid and maleic anhydride (water absorption of 0.5 to 0.7% by weight), an ionomer resin (water absorption 0.7 to 1.4% by weight) wherein carboxyl groups of an ethylene-(meth) acrylic acid copolymer are salted with a metal ion, preferably with an alkali metal ion such as sodium ion, potassium ion or lithium ion for intermolecular crosslinking, a copolymer of ethylene and (meth)acrylic acid (water absorption 0.5% by weight) and the like. Examples of the polyamide are nylon-6 (water absorption of 1.3 to 1.9% by weight), nylon-66 (water absorption of 1.5% by weight), copolymerized nylon (available from EMS-CHEMIE AG, Griltex; water absorption of 1.5 to 3% by weight) and the like. Examples of the thermoplastic polyester elastomer are, for instance, a block copolymer of poly(butylene terephthalate) and poly(tetramethylene glycol) (water absorption of 0.5% by weight) and the like. Examples of the cellulose derivatives are cellulose acetate, cellulose propionate and the like. These may be employed solely or in a combination use of two or more thereof.

Among those, the ionomer resin is preferable from the viewpoint of excellent dispersion property into a polyolefin resin and obtaining water-containing polyolefin resin composition having a high water content by using a relatively small amount thereof.

Examples of the above-mentioned water-absorptive polymer are a crosslinked acrylic acid salt polymer, a graft copolymer of starch and acrylic acid, a crosslinked poly(vinyl alcohol), a crosslinked poly(ethylene oxide), a copolymer of isobutylene and maleic acid, and the like.

Examples of the crosslinked acrylic acid salt polymer are a crosslinked polymer of sodium acrylate such as Aqualic available from Nippon Shokubai Co., Ltd. or Diawet available from Mitsubishi Chemical Corporation, and the like. These may be employed solely or in a combination use of two or more thereof.

Examples of the crosslinked poly(vinyl alcohol) are, for instance, various of crosslinked poly(vinyl alcohol) such as Aquareserve GP available from Nippon Gohsei Kagaku Kogyo Kabushiki Kaisha and the like. Examples of the crosslinked poly(ethylene oxide) are various crosslinked poly(ethylene oxide) such as Aquacork available from Sumitomo Seika Chemicals and the like. Examples of the copolymer of isobutylene and maleic acid are various copolymers of isobutylene and maleic acid such as KI Gel available from Kuraray Co., Ltd., and the like. These may be employed solely or in a combination use of two or more thereof.

Among those, the crosslinked poly(ethylene oxide) is preferable from the viewpoint of excellent dispersion property into a polyolefin resin and obtaining water-containing polyolefin resin composition having a high water content by using a relatively small amount thereof.

Examples of the above-mentioned water-soluble polymer are (meth)acrylic acid polymer, (meth)acrylic acid salt polymer, poly(vinyl alcohol), poly(ethylene oxide), water-soluble cellulose derivatives, and the like.

Examples of the (meth)acrylic acid polymer are poly(acrylic acid), a copolymer of acrylic acid and ethyl acrylate, poly(2-hydroxyethyl methacrylate), and the like. These may be employed solely or in a combination use of two or more thereof. Examples of the (meth)acrylic acid salt polymer are, for instance, poly(sodium acrylate), poly(sodium methacrylate), poly(potassium acrylate), poly(potassium methacrylate) and the like. Examples of the poly(vinyl alcohol) are, for instance, poly(vinyl alcohol), a copolymer of vinyl alcohol and vinyl acetate, and the like. Examples of the poly(ethylene oxide) are, for instance, poly(ethylene oxide) having tens of thousands to millions of a molecular weight and the like. Examples of the water-soluble cellulose derivatives are, for instance, carboxymethyl cellulose, hydroxyethyl cellulose and the like. Theses may be employed solely or in a combination use of two or more thereof.

The above-mentioned hygroscopic polymer, water-absorptive polymer, and water-soluble polymer may be employed solely or in a combination use of two or more thereof.

An amount of the hydrophilic polymer is preferably at least 0.001 part by weight, more preferably at least 0.01 part by weight based on 100 parts by weight of the polyolefin resin. And it is preferably at most 20 parts by weight, more preferably at most parts 10 by weight from the viewpoint of improving production stability and foaming characteristics in the preparation of pre-expanded particles, imparting excellent mechanical strength and heat resistance to molded articles obtained from the pre-expanded particles, and decreasing the dimensional change of molded articles upon water absorption.

From the viewpoint of obtaining expanded particles having uniform cells and a high expansion ratio, there can be added filler to a polyolefin resin composition containing the polyolefin resin or the polyolefin resin and the hydrophilic polymer.

An average particle diameter of the filler is preferably at most 50 $\mu$m, more preferably at most 10 $\mu$m, from the viewpoint of obtaining pre-expanded particles having uniform cells and a high expansion ratio, and obtaining a molded article having excellent mechanical strength and flexibility from the expanded particles. Furthermore, it is preferable at least 0.1 $\mu$m, more preferably at least 0.5 $\mu$m from the viewpoint of secondary agglomeration and handling workablility.

In the filler there are an inorganic filler and an organic filler.

Examples of the inorganic filler is talc, calcium carbonate, calcium hydroxide, aluminum hydroxide, silica, mica, china cray, diatom earth, rock wool, wollastonite, and the like. Among those, talc is preferable from the viewpoint of obtaining pre-expanded particles having uniform cells and a high expansion ratio.

There is no particular limitation for the organic filler, as long as it is solid at a temperature higher than a softening point of the polyolefin resin. Examples thereof are fluororesin powder, silicone resin powder, thermoplastic polyester resin powder and the like.

The fillers may be employed solely or in a combination use of two or more thereof.

An amount of the filler is at least 0.003 part by weight, more preferably at least 0.005 part by weight, based on 100 parts by weight of the polyolefin resin from the viewpoint of obtaining pre-expanded particles having a high expansion ratio. Furthermore, it is preferably at most 3 parts by weight, more preferably at most 2 parts by weight, from the viewpoint of exhibiting excellent adhesion property at molding of the pre-expanded particles and obtaining a molded article made thereof having excellent mechanical strength and flexibility.

The resin particles are dispersed into an aqueous dispersion medium in a pressure vessel, and heated to a temperature higher than a softening temperature of the polyolefin resin to immerse a blowing agent into the resin particles.

As an aqueous medium dispersing the resin particles, a dispersion agent and a surfactant are the same as described above. and an amount of the resin particles dispersed into the aqueous dispersion medium is also the same as described above.

A heating temperature after dispersing the resin particles is a temperature higher than the softening temperature of the used polyolefin resin, concretely not less than (the melting temperature thereof −10° C.), preferably not less than (the melting temperature +5° C.), preferably not more than (the melting temperature +20° C.), more preferably (the melting temperature +15° C.). For example, in case of a copolymer of ethylene and propylene having a melting temperature of 145° C. (an ethylene content of 3.9% by weight), the temperature is preferably 135 to 165° C., more preferably 150 to 160° C. If the temperature is less than 135° C., it becomes difficult to expand the particles. If the temperature is more than 160° C., mechanical strength and heat resistance of the obtained expanded article becomes insufficient, and the resin particles tend to be fused together in a vessel.

In case of water as a blowing agent, the resin particles are dispersed into an aqueous dispersion medium, heated and stirred for minutes to 12 hours, preferably 30 minutes to 12 hours, to obtain water-containing resin particles having a water content of 1 to 50%. The foamed particles of a polyolefin resin are prepared by introducing an inorganic gas into a pressure vessel to be a pressure in the vessel of 0.98 to 7.35 MPa, and releasing the particles into an atmosphere of a lower pressure than the inner pressure in the vessel through the flow-restricting device with maintaining the pressure.

Adjustment of the water content can be carried out by controlling a heating temperature, a heating time and the like. If the content is less than 1%, an apparent expansion ratio becomes less than 3.2 times even if the flow-restricting device of the present invention is used (in case of using a conventional flow-restricting device the expansion ratio is less than 3 times). Preferable water content is at least 3%. If the content is more than 50%, dispersion property of the resin particles into an aqueous dispersion medium becomes small, the resin particles becomes bulk in a pressure vessel at preparation of the expanded particles, and it becomes difficult to expand the particles uniformly. Preferable water content is at most 30%. A water absorption ratio of the hydrophilic polymer is a value measured at a room temperature, and the water content is a value measured at a high temperature (melting temperature). If the hydrophilic polymer having a water absorption ratio of at least 0.5% is used, the polymer having a water content of at least 1% is obtained.

In order to be a water content of 1 to 50% by heating the particles to a temperature higher than the softening temperature of the polyolefin resin, an expansion ratio can become 3.2 to 43 times, particularly 4.2 to 26 times by using the flow-restricting device of the present invention (in case of using a conventional flow-restricting device, the expansion ratio becomes 3 to 33, particularly 4 to 20 times). And the particles do not become bulk and can be formed into uniform expanded particles in an pressure vessel at preparation of expanded particles. If the content is less than 1%, a desired expansion ratio can not be obtained. If the content is more than 50%, dispersion property of the resin particles into an aqueous dispersion medium becomes small, the resin particles becomes bulk in a pressure vessel at preparation of the expanded particles, and it becomes difficult to expand the particles uniformly.

A softening temperature of the polyolefin resin is estimated by a peak temperature of the melting peak measured by DSC at a heating rate of 10° C./min. The water content is water absorption at a temperature higher than the melting temperature under vapor pressure, and it is estimated by the following method.

Namely, a 300 ml pressure-resistant ampule is charged with 50 g of particles of the polypropylene resin composition, 150 g of water, 0.5 g of basic tricalcium phosphate powder as a dispersion agent, and 0.03 g of sodium n-paraffinsulfonate. After the ampule was tightly closed, it was thermally treated for three hours in an oil bath adjusted at not less than a melting temperature of the polyolefin resin. After the ampule is cooled to a room temperature, the content thereof is removed and sufficiently washed with water to remove the dispersion agent. Weight (X) of the obtained water-containing particles having no water on the surface thereof is measured. The particles is dried for three hours in an oven adjusted at a temperature 20° C. higher than the melting point of the resin particles. Then weight (Y) of the particles cooled to a room temperature in a desiccator is measured to calculate the water content according to the following equation.

$$\text{Water Content (\% by weight)} = ((X-Y)/Y) \times 100$$

In case that the resin particles of the polyolefin resin composition contain a filler and the like, the water content is the value based on a sum of the polyolefin resin and the hydrophilic polymer.

As an inorganic gas used for controlling a pressure in the pressure vessel, there can be used nitrogen, air, or an inorganic gas containing them as a main component (usually at least 50% by volume, particularly at least 70% by volume) and an inert gas such as argon, helium or xenon, vapor, oxygen, hydrogen, and ozone in a small amount (at most 50% by volume, particularly at most 30% by volume). From the viewpoint of economy, productivity, safety, and environmental application, nitrogen and air are preferable.

The maintaining pressure by the inorganic gas is preferably 0.98 to 7.35 MPa, more preferably 2.45 to 7.35 MPa. If the pressure is not more than 0.98 MPa, the expanded particles having a desired expansion ratio can not be obtained. If the pressure is not less than 7.35 MPa, a diameter of foams becomes too fine, and a ratio of independent foams decreases to lose shrinkage, dimension stability, mechanical strength, and heat resistance of the molded article. A temperature of the inorganic gas used for controlling and maintaining pressure in the pressure vessel is preferably about (an expansion temperature ±5° C.) from the viewpoint that evenness of an expansion ratio of the obtained pre-expanded particles is decreased.

An inner pressure during releasing is preferably maintained at the reaching pressure.

Low pressure in the atmosphere of lower pressure is a pressure lower than the inner pressure, and the atmospheric pressure is usually selected. The atmosphere means a space, which contains a scattering track of a mixture of releasing particles and water.

The releasing is carried out through the flow-restricting device of the present invention attached to the releasing part.

If a volatile blowing agent or an inorganic gas (for example, carbon dioxide) is used as a blowing agent, a hydrophilic polymer is not necessarily contained since there is no need for polyolefin resin particles' containing water. Polyolefin resin particles may be prepared, dispersed into an aqueous dispersion medium, heated, and immersed with a blowing agent in the same manner as mentioned above except for using no hydrophilic polymer. A pressure after adding a blowing agent is usually 0.98 to 7.35 MPa, and a maintaining time is usually 5 to 60 minutes.

Examples of the blowing agent are aliphatic hydrocarbons such as propane, butane, pentane and hexane; alicyclic hydrocarbons such as cyclopentane and cyclobutane; halogenated hydrocarbons such as trichloromonofluoromethane, dichlorodifluoromethane, dichlorotetrafluoroethane, trichlorotrifluoroethane, methyl chloride, methylene chloride and ethyl chloride; and the like. These may be employed solely or in a combination use of two or more thereof. An amount of the blowing agent is usually 5 to 50 parts by weight based on 100 parts by weight of the polyolefin resin.

Expanded polyolefin resin particles are preferably prepared by releasing the content by passing through the flow-restricting device into an atmosphere having a lower pressure than the inner pressure in the pressure vessel with maintaining the inner pressure in the pressure vessel.

The flow-restricting device is usually used for controlling the releasing time and uniformity of an expansion ratio. The expansion ratio can be improved by using the flow-restricting device having a particular opening.

In the present invention an opening means a slit or a hole.

There is no particular limitation for a shape of the flow-restricting device itself, but it is necessary for the opening attached to the flow-restricting device to satisfy the following conditions. If the thickness is less than 0.5 mm, it becomes easier to break the flow-restricting device due to a pressure inside the pressure vessel. Therefore, it is not preferably too thick, it is more preferably at least 0.8 mm.

Namely, when the flow-restricting device is observed at the front thereof, a width or a long diameter of the opening is defined as L, a height or a short diameter is defined as Hf, a height or a short diameter at the narrowest part of the opening is defined as Hn, an area at the narrowest part of the opening is defined as S, a depth (land length) at the narrowest part of the opening is defined as d, the following equations are satisfied. In case L/Hf is at least 1.5 mm, Hn is 1 to 4 mm, preferably 2 to 3.5 mm, d is 0 to 5 mm, preferably 0.2 to 3 mm. In case L/Hf is less than 1.5 mm, S is 0.5 to 10 mm$^2$, preferably 3 to 8 mm$^2$, d is 0 to 5 mm, preferably 0.2 to 3 mm.

Figure 4:
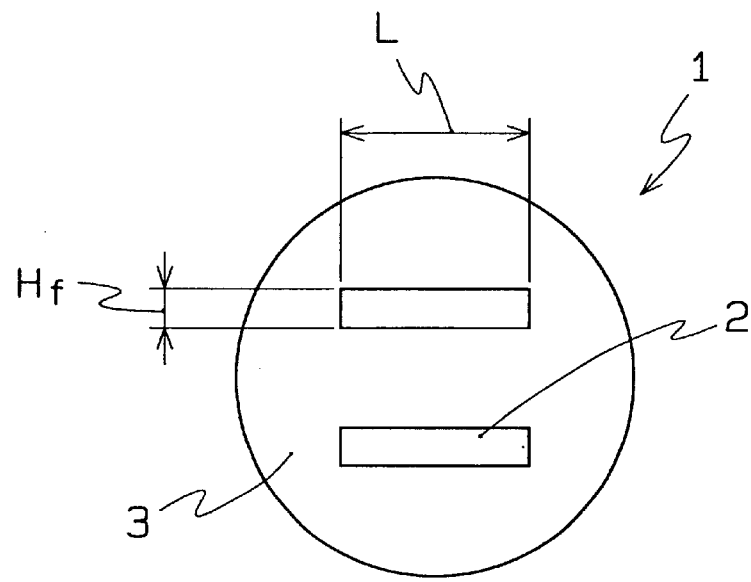
FIG. 4 shows an explanatory figure for a flow-restricting device containing slits, which is seen from the front thereof.
Figure 5:
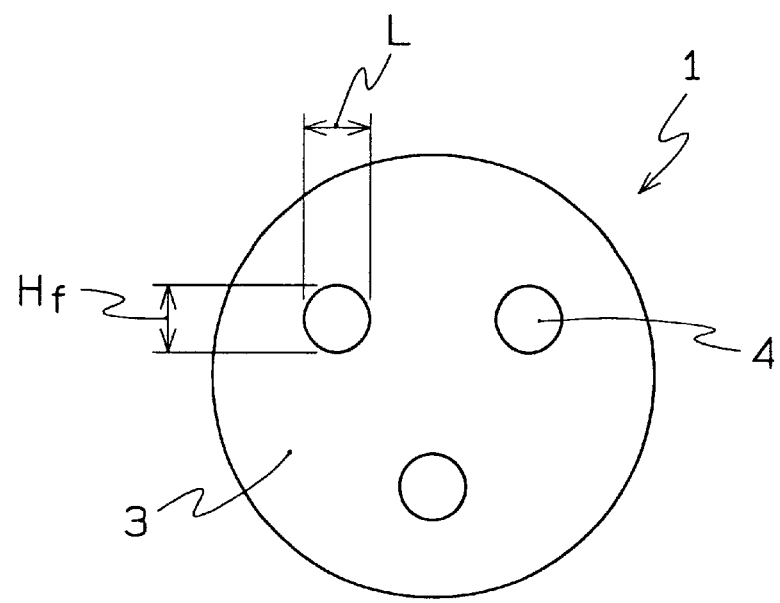
FIG. 5 shows an explanatory figure for a flow-restricting device containing holes, which is seen from the front thereof.
Figure 6:
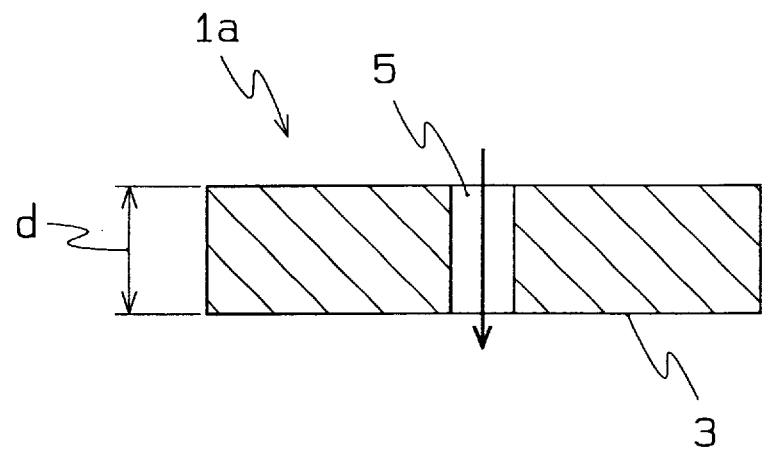
FIG. 6 shows a cross sectional view of an opening in a flow-restricting device having an orifice type at d>0 in an axial direction.
Figure 7:
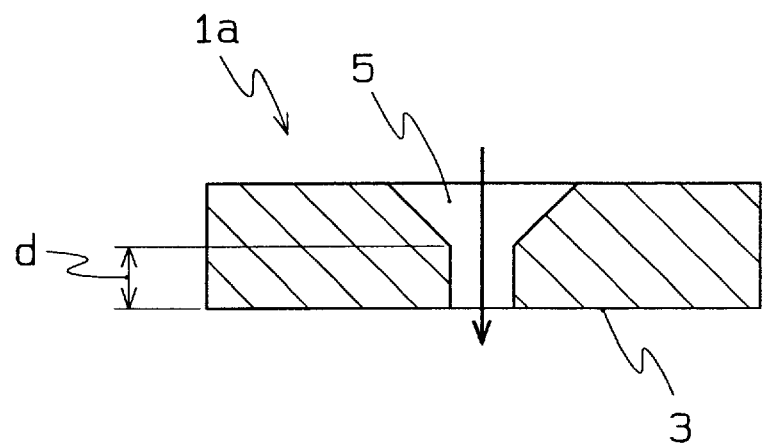
FIG. 7 shows another cross sectional view of an opening in a flow-restricting device having an orifice type at d>0 in an axial direction.
Figure 8:
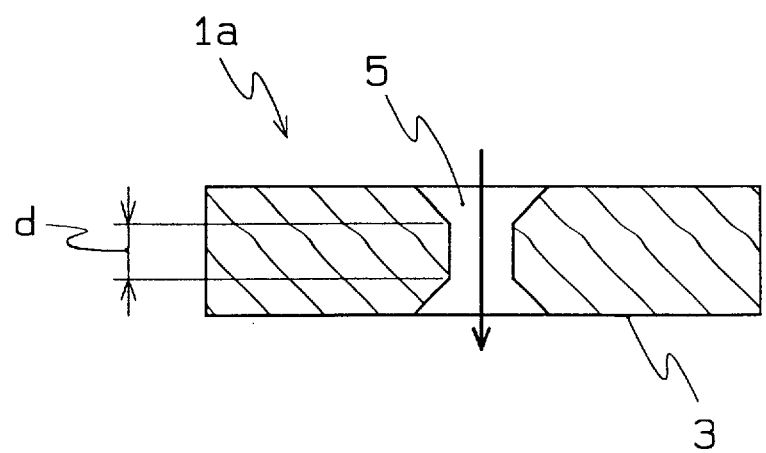
FIG. 8 shows another cross sectional view of an opening in a flow-restricting device having an orifice type at d>0 in an axial direction.
Figure 9:
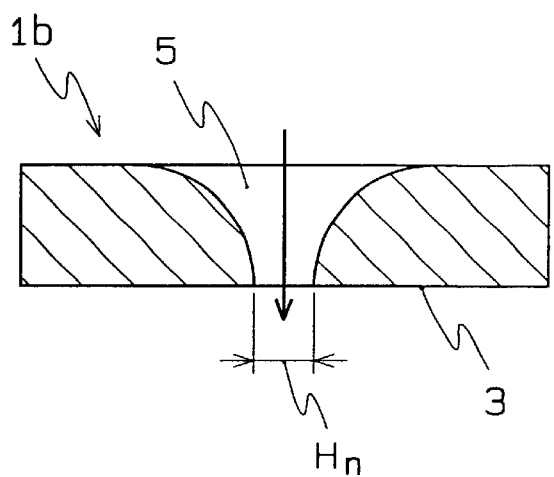
FIG. 9 shows a cross sectional view of an opening in a flow-restricting device having an orifice type at d=0 in an axial direction.
Figure 10:
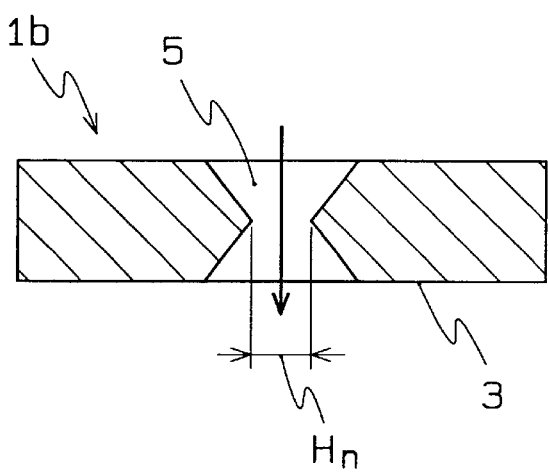
FIG. 10 shows another cross sectional view of an opening in a flow-restricting device having an orifice type at d=0 in an axial direction.
Figure 11:
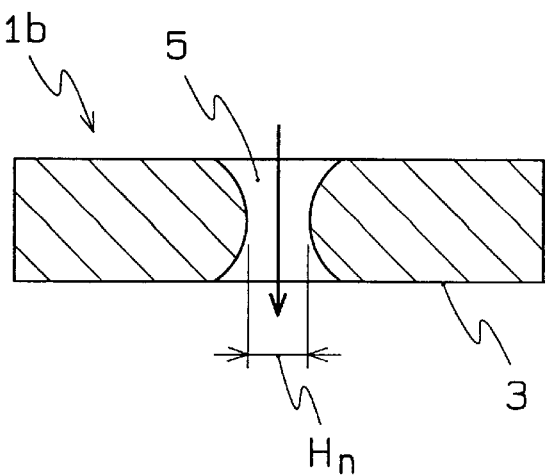
FIG. 11 shows another cross sectional view of an opening in a flow-restricting device having an orifice type at d=0 in an axial direction.
Figure 12:
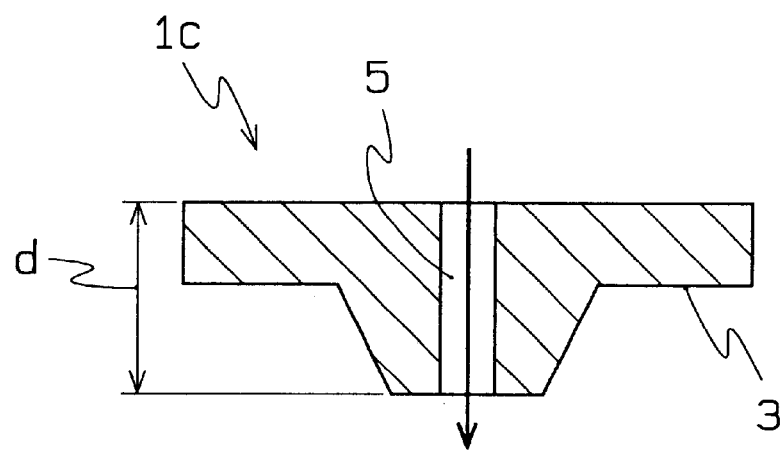
FIG. 12 shows a cross sectional view of an opening in a flow-restricting device having a nozzle type in an axial direction.
Figure 13:
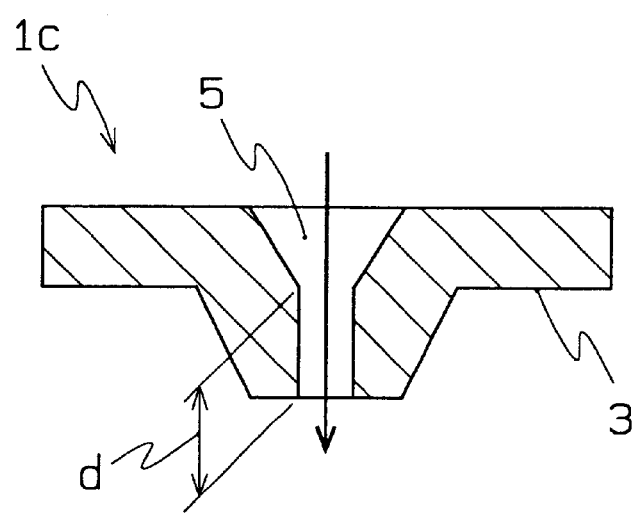
FIG. 13 shows another cross sectional view of an opening in a flow-restricting device having a nozzle type in an axial direction.

In order to understand the relationship among L, Hf, Hn, S and d, FIG. 4 shows an explanatory figure for a flow-restricting device containing slits, which is seen from the front, FIG. 5 shows an explanatory figure for a flow-restricting device containing holes, which is seen from the front, FIGS. 6 to 8 show cross sectional views of an opening in a flow-restricting device having an orifice type at d>0 in an axial direction, FIGS. 9 to 11 show cross sectional views of an opening in a flow-restricting device having an orifice type at d=0 in an axial direction, and FIGS. 12 to 13 show cross sectional views of an opening in a flow-restricting device having a nozzle type in axial direction. In the figure, → shows a releasing direction.

In case L/Hf is at least 1.5 mm, since the opening becomes slender, an area thereof becomes large and a releasing amount becomes large, a short-time treatment can be achieved and it becomes difficult to clog up. The upper limit of L/Hf is 5, particularly 3 from the viewpoint of uniformity of an expansion ratio. If Hn is more than 4 mm, an expansion ratio becomes low. If Hn is less than 1 mm, it becomes easy to clog up an opening. If d is more than 5 mm, an expansion ratio becomes low. If the narrowest part is a point as shown in FIGS. 9 to 11, d becomes 0 mm. As long as Hn satisfies the above conditions, expanded particles having a high expansion ratio can be obtained.

In case L/Hf is less than 1.5 mm, since an opening becomes nearly round or regularly polygonal, a ratio of thermal fusion among the expanded particles becomes small, and a diameter of particles and an expansion ratio becomes uniform.

The lower limit of L/Hf is 1. If L/Hf is near the lower limit, it becomes preferable, since it becomes easier to produce an opening. If S is more than 10 mm², an expansion ratio can not be improved. If S is less than 0.5 mm², it becomes easy to clog up an opening. A depth d is the same as in L/Hf ≧1.5.

Next, there are explained a method of estimating a width or a long diameter L of an opening attached to the flow-restricting device, a height or a short diameter Hf thereof, and a height or a short diameter Hn at the narrowest part, an area S and a depth d.

A slit as one of an opening means a hole of a polygon such as a rectangle, a square, a lozenge, a trapezoid, a parallelogram, another quadrangle, a triangle, a pentagon and a hexagon. A hole as one of an opening means a circle, an ellipse, rectangle and a shape having a quadrangle with two semicircles at the against lines of the quadrangle, which have a diameter of a length of the quadrangle. A width (or a long diameter) of the rectangle and a height (or a short diameter) thereof correspond to a long side and a short side respectively. In case of a square, a long side is the same as a short side. In case of a trapezoid, among a base and a height, the larger is a width (or a long diameter), and the shorter is a height (or a short diameter). In another case, among segments cut off by a line which passes a center of a gravity of an opening shape the longest is a long diameter and the shortest is a short diameter. In case of an ellipse, a long axis and a short axis is a width (or a long diameter) and a height (or a short diameter) respectively. In another case, among segments cut off by a line which passes a center of a gravity of an opening shape the longest is a long diameter and the shortest is a short diameter.

A height or a short diameter at the narrowest part means a value having the smallest height or the smallest short diameter among openings, which are cut into thin round slices in a releasing direction. The area thereof means a value having the smallest value among openings, which are cut into thin round slices in the releasing direction as shown above. A depth means a height, a short diameter or a thickness having a minimum area.

If the orifice as shown in FIG. 7 is attached to a circular releasing plumbing and a diameter D of the releasing plumbing is equal to a diameter L of a circular hole at a back surface of the orifice (releasing plumbing side), unevenness of an expansion ratio becomes small. An orifice shown in FIGS. 8 to 11 is the same as the above.

The flow-restricting device has at least one opening, preferably 1 to 10 openings. A plurality of openings are preferable from the viewpoint of production rate.

If at least two openings are attached, all of a plurality of openings may be the same or different, or a part of the openings may be the same or the different. For example, there may be at least one opening, preferably 1 to 10 openings, having L/Hf ≧1.5, Hn=1 to 4 mm, d=0 to 5 mm, and at least one opening, preferably 1 to 10 openings, having L/Hf<1.5, S=0.5 to 10 mm², d=0 to 5 mm.

As the flow-restricting device, either of orifice type, nozzle type or venturi type can be used. These flow-restricting devices may be employed solely or in a combination use of two or more thereof.

There is no particular limitation for a combination of at least two flow-restricting devices used as a drawing machine. For example, in case of a combination of two flow-restricting devices, these may be used in parallel or series toward a releasing direction. In case of parallel combination, a releasing rate becomes large and productivity becomes large. On the other hand, in case of series combination, a diameter of foaming becomes large.

Figure 14:
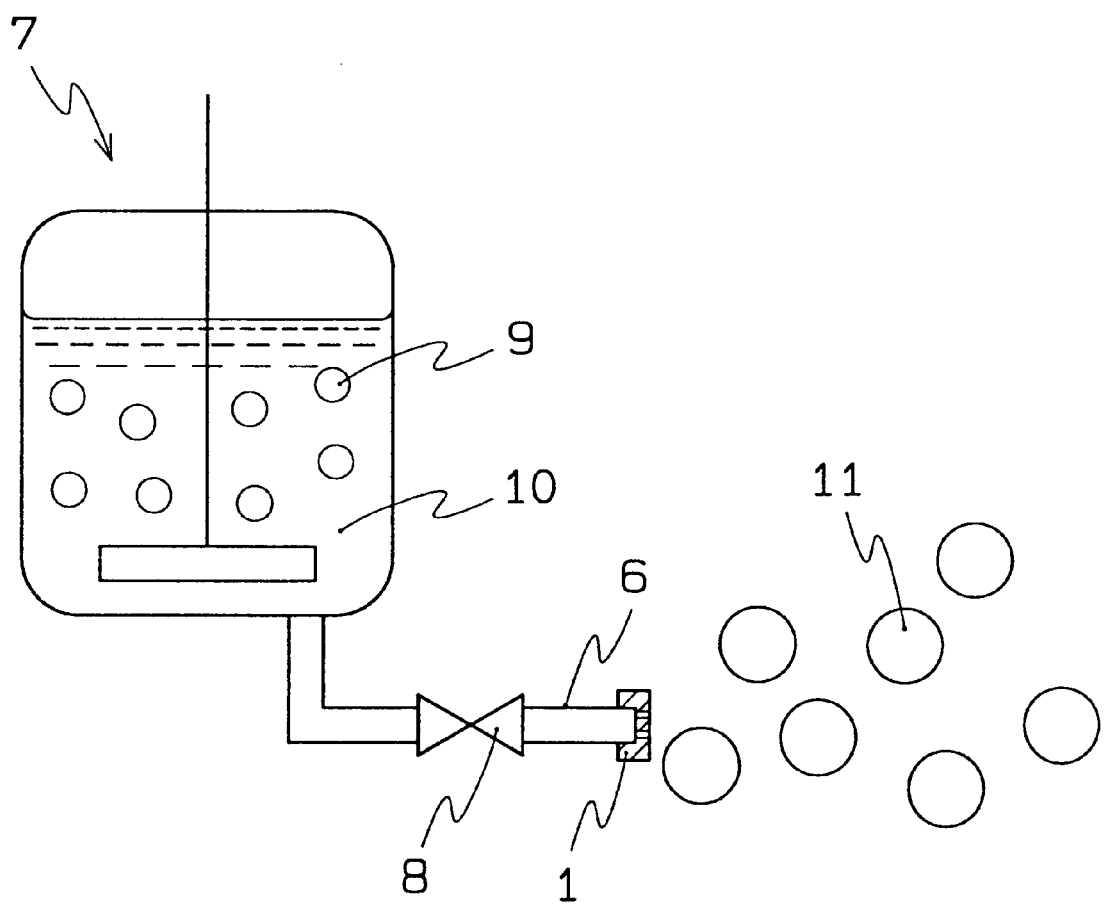
FIG. 14 shows an explanatory view of preparation machine of expanded particles equipped with the flow-restricting device of the present invention.

Though the flow-restricting device 1 is usually attached to an exit of a releasing plumbing 6 shown in FIG. 14, it may be attached between a bulb 8 at a lower part of a pressure vessel 7 and the pressure vessel 7. Position of the flow-restricting device is not limited to the exit of the releasing plumbing 6, the flow-restricting device may be attached on the way of the releasing plumbing 6. In FIG. 14, 9 shows resin particles, shows an aqueous dispersion medium and 11 shows expanded particles.

The pre-expanded particles of the polyolefin resin particles thus obtained have an expansion ratio of 3.2 to 43, preferably 4.2 to 26 times (in case of a conventional flow-restricting device, 3 to 33 times, particularly 4 to 20 times), a closed cell content of 80 to 100%, preferably 90 to 100%, and an average foam diameter of 10 to 500 μm, preferably 50 to 300 μm. An expansion ratio increases about to 30% compared with a case of the conventional flow-restricting device.

In case the expansion ratio is less than about 3.2 times, flexibility and cushioning property of the obtained molded article become insufficient. On the other hand, if the expansion ratio is more than about 43 times, mechanical strength and heat resistance of a molded article become insufficient. Also, if the closed cell ratio is less than 80%, the pre-expanded particles lack the secondary expanding force, thus fusing failure occurs upon molding to deteriorate the mechanical strength and the like of the obtained molded article. If the average cell diameter is less than 10 μm, there arises a problem that the shape of molded article obtained from the pre-expanded particles is distorted. On the other hand, if the average cell diameter is more than 500 μm, mechanical strength of the obtained molded article is lowered.

Since the expanded particles of polyolefin resin has the closed cell ratio of at least 80%, the expanded article having the same shape as a mold may be prepared by introducing the pre-expanded particles into a mold after impregnation of air by processing them in a pressure vessel under heating and pressuring for constant time, and then by thermally forming them by the method such as vapor heating, if desired.

The formed article thus obtained is excellent in flexibility and cushioning property, and has a small shrinkage ratio and a small dimensional distortion, and the commodity value thereof is extremely high.

EXAMPLES

The present invention is then explained in detail by means of examples and comparative examples, and the present invention is not limited to these examples. In Examples "parts" and "%" mean "parts by weight" and "% by weight" respectively unless otherwise specified.

Evaluation methods in examples and comparative examples are shown below.

(Expansion Ratio)

After weighing consciously 1 to 3 g of the obtained pre-expanded particles, the particles were completely sunk in a 100 milliliter measuring cylinder, which was filled with an ethanol aqueous solution in half. By using meniscus values of the ethanol aqueous solution before and after sinking, a volume of the pre-expanded particles is obtained. The true density of the pre-expanded particles was calculated by dividing the weight by the volume.

The density of the pellets of the propylene resin composition (resin particles) used for obtaining the pre-expanded particles was divided by the true density thereof to obtain a value which was adopted as an expansion ratio.

(Improving Ratio)

Figure 2:
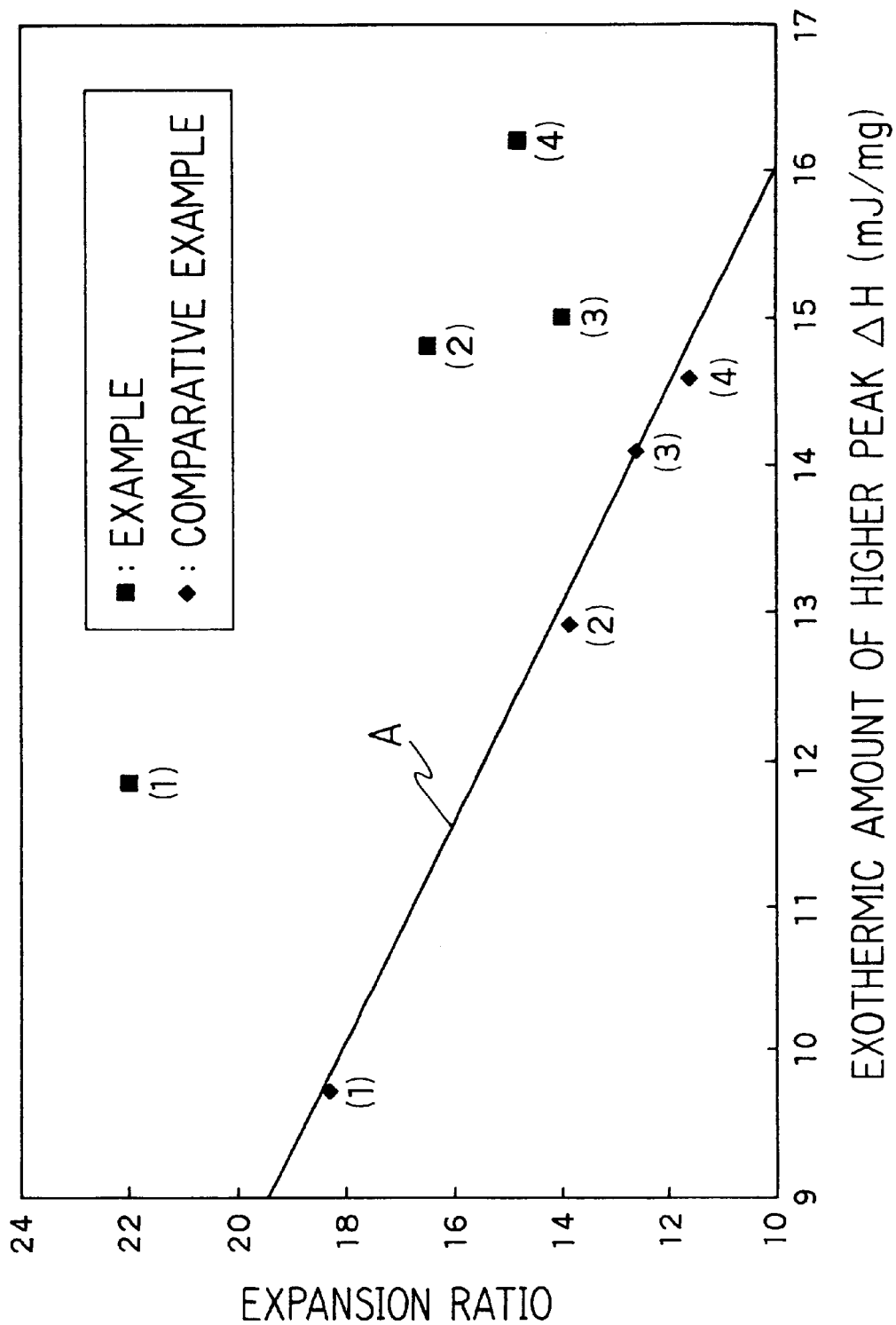
FIG. 2 shows an explanatory graph for an improving ratio obtained by the tropics estimated from an endothermic amount $\Delta H$ of the higher melting temperature and the expansion ratio of the pre-expanded particles in Comparative Examples 1 to 4, which are not maintained at the foaming temperature to the foaming temperature $-1°$ C. for a long time.

In order to show a negative linear relationship between an endothermic amount ΔH at a higher temperature and an expansion ratio in case without holding for a long time as in the present invention, endothermic amounts ΔH at a higher temperature and expansion ratios concerning Comparative Examples 1 to 4 are plotted as in FIG. 2 to obtain the tropics A. From FIG. 2 it is understood that a result of four standards without holding for a long time shows a nearly linear relationship between ΔH and an expansion ratio. This graph is the same as described in FIG. 6 of Japanese Unexamined Patent Publication No.259724/1996.

Endothermic amounts ΔH and expansion ratios concerning Examples 1 to 4 with holding for a long time are plotted on the same graph, and a difference between the value and the expected value of the expansion ratio on the tropics is calculated to obtain an improving ratio.

The endothermic amount ΔH at a higher temperature means an endothermic amount calculated by an area of almost triangular region consisting of a tangent line and a peak at a higher temperature in a DSC curve as shown in FIG. 1; the tangent line is drawn from the point having a slope of 0 to a higher temperature between two endothermic peaks in a DSC curve of the pre-expanded particles.

EXAMPLE 1

There were supplied to an extruder and kneaded 100 parts of a random copolymer of ethylene and propylene (ethylene content of 3.9%, MI=10 g/10 minutes), 2 parts of an ethylenically ionomer resin (an ionization ratio of 59%) in which carboxylic groups of the copolymer of ethylene and methacrylic acid is salted by sodium ion to crosslink intermolecularly, and 0.3 part of a filler (talc, an average particle diameter of 9.5 $\mu$m), to prepare propylene resin particles (1.8 mg/particle, a melting temperature of 146.5° C.).

Then, 100 parts of the obtained propylene resin particles, 0.5 part of powdery basic tricalcium phosphate as a dispersing agent, 0.005 part of sodium n-paraffinsulfonate as a dispersion assistant were placed in a pressure vessel (internal volume of 200 litter) together with 300 parts of water. The content in the pressure vessel was heated to 154.2° C. for 80 minutes and maintained at 154.2° C. to 155.2° C. for 87 minutes by controlling a vapor pressure in a jacket with a controlling bulb. Thereafter, expansion was carried out at an expansion temperature of 155.2 ° C. to obtain the pre-expanded particles of a propylene resin. At the latter half of the temperature maintaining time, air was introduced into the pressure vessel to be an inner pressure in the pressure vessel of 2.94 MPa. And then, the content was released into an atmosphere through a circular orifice having a diameter of 4 mm and a land length of 1 mm. During releasing, air heated to about 155° C. was quantitatively introduced into the pressure vessel to maintain a constant expansion pressure.

A DSC curve of the obtained pre-expanded particles is shown in FIG. 1. Measuring an endothermic amount at a higher temperature ΔH and a temperature difference ΔT (peak temperature differences between two melting temperatures (peak temperature), ΔH was 11.8 mJ/mg, and ΔT was 21.1° C. And an expansion ratio was 22.0 times. From ΔH of 11.8 mJ/mg, an expected value of an expansion ratio in case without maintaining for a long time was estimated as 15.4 times. Since the particles were not maintained for a long time, an expansion ratio of the obtained pre-expanded particles was 22.0 times. Therefore, an improving ratio was 6.6 times by the difference thereof.

EXAMPLE 2

Except for the maintaining temperature of 153.9 to 154.9° C. (an expansion temperature of 154.9° C.) and the maintaining time of 83 minutes, pre-expanded particles of a propylene resin were obtained in the same manner as in Example 1. ΔH of the obtained pre-expanded particles was 14.8 mJ/mg, and ΔT was 21.0° C. An expansion ratio was 16.5 times and an improving ratio was 5.2 times.

EXAMPLE 3

Except for the maintaining temperature of 152.5 to 153.5° C. (an expansion temperature of 153.5° C.) and the maintaining time of 40 minutes, pre-expanded particles of a propylene resin were obtained in the same manner as in Example 1. ΔH of the obtained pre-expanded particles was 15.0 mJ/mg, and ΔT was 20.4° C. An expansion ratio was 14.0 times and an improving ratio was 3.0 times.

EXAMPLE 4

Except for the maintaining time of 86 minutes, pre-expanded particles of a propylene resin were obtained in the same manner as in Example 3. ΔH of the obtained pre-expanded particles was 16.2 mJ/mg, and ΔT was 21.2° C. An expansion ratio was 14.8 times and an improving ratio was 5.5 times.

COMPARATIVE EXAMPLE 1

Except for the maintaining time of 17 minutes, pre-expanded particles of a propylene resin were obtained in the same manner as in Example 1. ΔH of the obtained pre-expanded particles was 9.7 mJ/mg, and ΔT was 19.5° C. An expansion ratio was 18.3 times.

COMPARATIVE EXAMPLE 2

Except for the maintaining time of 15 minutes, pre-expanded particles of a propylene resin were obtained in the same manner as in Example 2. ΔH of the obtained pre-expanded particles was 12.9 mJ/mg, and ΔT was 19.6° C. An expansion ratio was 13.9 times.

The property was the same as in the conventional method, wherein a maintaining temperature at a second step was 5° C. higher than that at a first step and the respective maintaining times were 15 minutes. Namely, since temperature maintaining for a long time as in the present invention was not carried out in the method having two divided steps, it is thought that secondary crystalline does not sufficiently grow during maintaining a temperature. From this fact, the present invention is proved to be effective.

COMPARATIVE EXAMPLE 3

Except for the maintaining time of 28 minutes, pre-expanded particles of a propylene resin were obtained in the same manner as in Example 2. ΔH of the obtained pre-expanded particles was 14.1 mJ/mg, and ΔT was 19.8° C. An expansion ratio was 12.6 times.

COMPARATIVE EXAMPLE 4

Except for the maintaining time of 13 minutes, pre-expanded particles of a propylene resin were obtained in the same manner as in Example 3. ΔH of the obtained pre-expanded particles was 14.6 mJ/mg, and ΔT was 19.7°C. An expansion ratio was 11.6 times.

Effects of the present invention were shown as follows.

As shown in FIG. 2, if the maintaining time is less than 30 minutes in the preparation of the pre-expanded particles, a relationship between ΔH and an expansion ratio is a negative linear relationship. On the contrast to this, if the maintaining time is at least 30 minutes as in the present preparation method, an expansion ratio is drastically improved with a deviation from the negative linear relationship.

Figure 3:
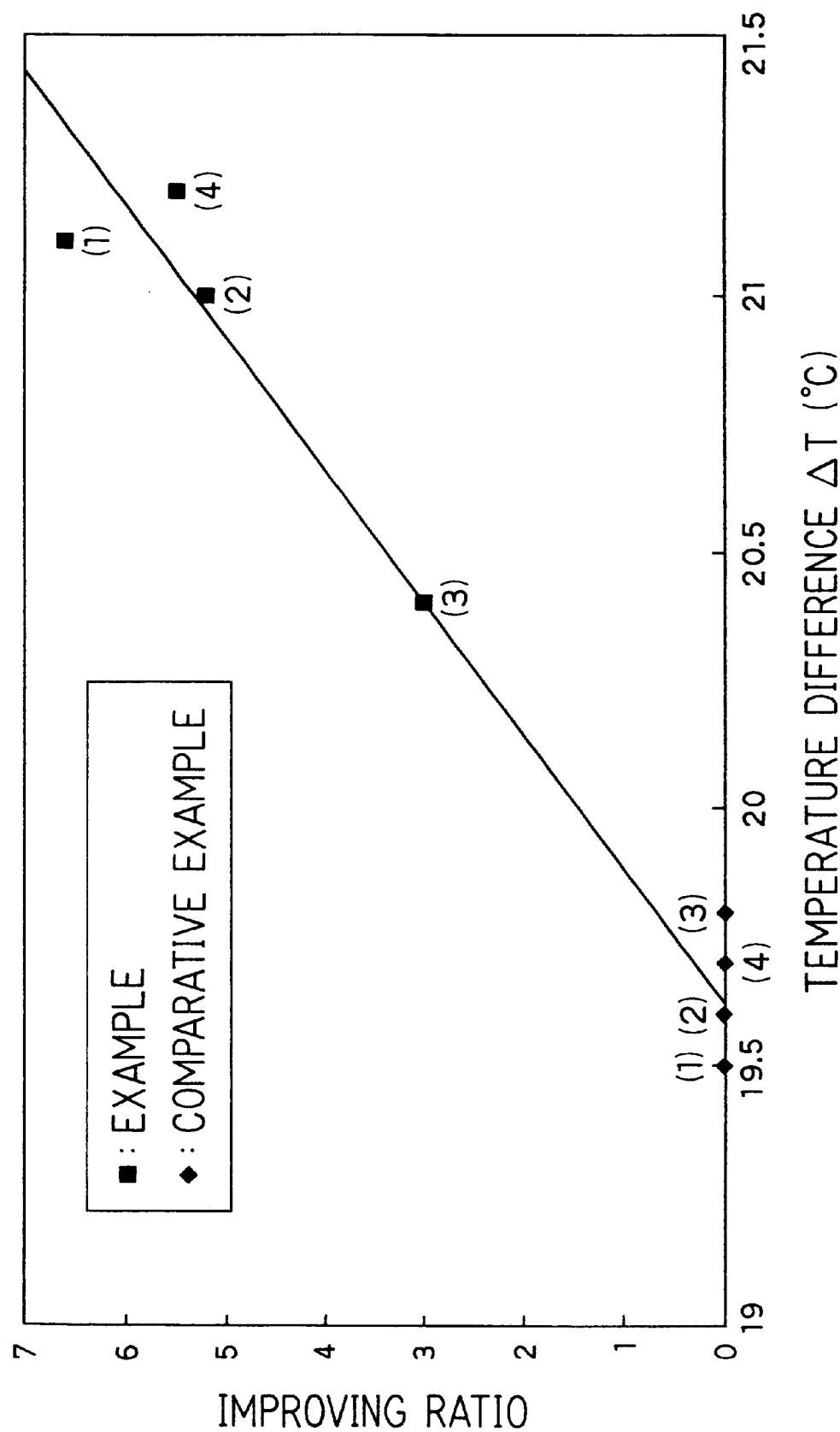
FIG. 3 shows a graph for relationship between a temperature difference $\Delta T$ of two melting temperatures and an improving ratio.

From FIG. 3 showing a relationship between a temperature difference ΔT of two melting temperatures and an improving ratio, a relationship between ΔT and an improving ratio is a positive linear relationship. The larger ΔT becomes, the more the expansion ratio is improved.

Each pre-expanded particles obtained in Examples were supplied to molding. All particles were excellent in molding adhesion and the obtained molded articles were excellent in heat resistance, mechanical strength and dimensional stability at water absorption compared with a case using each pre-expanded particles obtained in Comparative Examples.

EXAMPLES 5 to 15 and COMPARATIVE EXAMPLES 5 to 7

There were supplied to an extruder with a 50 mm φ single screw and kneaded 98 parts of a random copolymer of ethylene and propylene (Noblen FM321B available from Sumitomo Chemical Co., Ltd., a density of 0.91 g/cm$^3$, a melting temperature of 145° C., MI=5.5 g/10 minutes, flexural modulus of 980 MPa) as a polyolefin resin, 2 parts of an ethylenically ionomer (HIMILAN 1707 available from Mitsui Du Pont Polychemical Co., Ltd.), and 1 part of talc as an inorganic filler (an average particle diameter of 7 μm). The mixture was extruded through a cylindrical die having a diameter of 1.5 mm φ. The mixture was cut by a cutter after cooling to obtain the cylindrical particles of polyolefin resin composition (hereinafter referred to as "resin particles"). A melting temperature of the obtained polyolefin resin composition was 145° C., and a density thereof measured according to JIS K 7112 was 0.90.

Then, 100 parts of the obtained resin particles, 200 parts of water, 0.5 part of tricalcium phosphate and 0.04 part of sodium n-paraffinsulfonate were placed in a pressure vessel. The mixture was heated to 155° C. with stirring. At that time a pressure was about 0.49 MPa. Thereafter, increasing an inner pressure in the pressure vessel to 2.94 MPa by introducing compressed air, a valve provided at a lower part of the vessel was opened to release the aqueous dispersion mixture (resin particles and an aqueous dispersion medium) into an atmospheric pressure through the flow-restricting device of an orifice type having a size shown in Table 1 to obtain the pre-expanded particles having an independent foam structure. At that time, during releasing a pressure was maintained by air in order to keep the pressure in the pressure vessel.

As Comparative Examples 5 to 6, expanded particles were obtained by using the conventional flow-restricting device having an orifice type in the same manner as in described above. As Comparative Example 7, expanded particles were obtained in the same manner as described above except for by releasing through a circular releasing plumbing without using a flow-restricting device having an orifice type An expansion ratio of the obtained expanded particles was measured according to the above-mentioned method. The results are shown in Table 1. In Table 1, an expansion ratio after drying means a ratio after drying at 60° C. for 24 hours and an expansion ratio after impregnation means a ratio in a state of recovering completely shrinkage of the expanded particles by increasing a pressure inside the expanded particles to higher pressure than an atmospheric pressure after leaving under an air pressure of 0.98 MPa for 3 hours. It is thought a maximum ratio of the expanded particles.

TABLE 1

| | | Example No. | | | | | | | | | | | Comparative Example No. | | |
|---|---|---|---|---|---|---|---|---|---|---|---|---|---|---|---|
| | No. | 1 | 2 | 3 | 4 | 5 | 6 | 7 | 8 | 9 | 10 | 11 | 1 | 2 | 3 |
| Orifice type | shape of slit or hole | circle | circle | circle | circle | circle | circle | circle | circle | rect-angle | rect-angle | rect-angle | circle | circle | — |
| drawing plate | L (mm) | 2 | 4 | 2.8 | 2.8 | 2.8 | 3.2 | 6.4 | 3.2 | 6 | 6 | 6 | 7.2 | 4 | — |
| | Hf (mm) | 2 | 4 | 2.8 | 2.8 | 2.8 | 3.2 | 6.4 | 3.2 | 3 | 2 | 2 | 7.2 | 4 | — |
| | Hn (mm) | 2 | 2 | 2.8 | 2.8 | 2.8 | 3.2 | 3.2 | 3.2 | 3 | 2 | 2 | 4 | 4 | — |
| | S (mm2) | 3.1 | 3.1 | 6.2 | 6.2 | 6.2 | 8.0 | 8.0 | 8.0 | 18 | 12 | 12 | 12.6 | 12.6 | — |
| | d (mm) | 0.5 | 0.5 | 1 | 2 | 5 | 1 | 2 | 5 | 2 | 1 | 0.5 | 2.5 | 5 | — |
| | thickness (mm) | 0.5 | 1.5 | 1 | 2 | 5 | 1 | 4 | 5 | 2 | 1 | 0.5 | 5 | 5 | — |
| | L/Hf | 1 | 1 | 1 | 1 | 1 | 1 | 1 | 1 | 2 | 3 | 3 | 1 | 1 | — |
| Results of expansion ratio (time) | after drying | 15.0 | 15.2 | 14.9 | 14.1 | 13.5 | 13.8 | 13.6 | 13.5 | 14.0 | 15.0 | 15.1 | 12.0 | 12.2 | 8.2 |
| | after impregnation | 17.3 | 18.2 | 17.0 | 16.5 | 15.2 | 15.8 | 16.0 | 15.2 | 16.3 | 17.8 | 17.6 | 13.8 | 14.0 | 10.0 |

By using the preparation method of the present invention an expansion ratio can be improved without increasing an expansion pressure. And PP pre-expanded particles of the present invention are excellent in molding adhesion, a molded article can be obtained, which is excellent in heat resistance, mechanical strength and dimensional stability at water absorption.

By using a flow-restricting-device or a drawing machine of the present invention, if a volatile blowing agent is used, an expansion pressure is low in case of using a small amount of the blowing agent, expanded particles having a high expansion ratio can be obtained, processes are simplified, and the process is excellent in economy. And if an inorganic gas or water is used as a blowing agent, expanded particles having a high expansion ratio can be obtained under the same expansion pressure and the process is excellent in economy.

What is claimed is:

1. A flow-restricting device, which is used for a releasing part at preparing expanded particles by dispersing thermoplastic resin particles into an aqueous dispersion medium in a pressure vessel, impregnating a blowing agent and releasing the mixture into a lower atmosphere;

said flow restricting device is equipped with at least one opening satisfying either of the following two conditions, (1) $L/Hf \geqq 1.5$ mm, $Hn = 1$ to 4 mm, $d = 0$ to 5 mm (2) $L/Hf < 1.5$ mm, $S = 0.5$ to 10 mm$^2$, $d = 0$ to 5 mm wherein a front width or a long diameter of the opening attached to the flow-restricting device is L, a height or a short diameter is Hf, a height or a short diameter at the narrowest part in the opening is Hn, an area at the narrowest part in the opening is S, and a depth (land length) is d.

2. The flow-restricting device of claim 1, wherein Hn is 2 to 3.5 mm, and d is 0.2 to 3 mm.

3. The flow-restricting device of claim 1, wherein S is 3 to 8 mm$^2$, and d is 0.2 to 3 mm.

4. The flow-restricting device of claim 1, wherein the flow-restricting device used at a releasing part is an orifice type or a nozzle type.

5. The flow-restricting device of claim 1, wherein the thermoplastic resin particles are polyolefin resin particles.

6. A drawing machine, wherein at least two flow-restricting devices selected from the group consisting of at least one kind of flow-restricting devices described in claim 1 are arranged in parallel in a releasing direction.

7. The drawing machine of claim 6, wherein said at least two flow-restricting devices are an orifice type or a nozzle type.

* * * * *